United States Patent
Fritz

(10) Patent No.: US 10,027,531 B1
(45) Date of Patent: *Jul. 17, 2018

(54) FAILOVER SYSTEM AND METHOD FOR IP TELEPHONY

(71) Applicant: ShoreTel, Inc., Sunnyvale, CA (US)

(72) Inventor: Kent A. Fritz, Mountain View, CA (US)

(73) Assignee: Mitel Networks, Inc., Delaware ( * ) Notice: Subject to any disclaimer, the term of this patent is extended or adjusted under 35 U.S.C. 154(b) by 0 days.

This patent is subject to a terminal disclaimer.

(21) Appl. No.: 15/184,345

(22) Filed: Jun. 16, 2016

Related U.S. Application Data

(63) Continuation of application No. 13/418,301, filed on Mar. 12, 2012, now Pat. No. 9,397,881, which is a continuation of application No. 12/395,155, filed on Feb. 27, 2009, now Pat. No. 8,159,935.

(60) Provisional application No. 61/144,020, filed on Jan. 12, 2009.

(51) Int. Cl.
| | |
|---|---|
| H04L 12/26 | (2006.01) |
| H04L 12/24 | (2006.01) |
| H04L 29/12 | (2006.01) |
| H04M 7/00 | (2006.01) |
| H04L 12/939 | (2013.01) |
| H04L 29/14 | (2006.01) |

(52) U.S. Cl.
CPC ........ *H04L 41/0654* (2013.01); *H04L 49/552* (2013.01); *H04L 61/2007* (2013.01); *H04L 69/40* (2013.01); *H04M 7/0084* (2013.01)

(58) Field of Classification Search
CPC .... H04L 41/0654; H04L 49/552; H04L 69/40
See application file for complete search history.

(56) References Cited

U.S. PATENT DOCUMENTS

| | | | |
|---|---|---|---|
| 5,822,302 A | 10/1998 | Scheetz et al. | |
| 6,396,815 B1 | 5/2002 | Greaves et al. | |
| 6,857,023 B2 | 2/2005 | Cain | |
| 7,136,383 B1 | 11/2006 | Wilson | |
| 7,428,209 B1 | 9/2008 | Roberts | |
| 7,792,016 B2 | 9/2010 | Arai et al. | |
| 9,397,881 B1* | 7/2016 | Fritz | ......... H04L 41/0663 |
| 2001/0056503 A1 | 12/2001 | Hibbard | |
| 2003/0145246 A1 | 7/2003 | Suemura | |
| 2003/0233473 A1 | 12/2003 | Bonhomme et al. | |
| 2004/0078481 A1 | 4/2004 | Rudd et al. | |

(Continued)

*Primary Examiner* — Jutai Kao

(57) ABSTRACT

A failover system includes a plurality of configuration controllers and a plurality of switches. The switches include a site proxy, a failover module and a routing table. A first site proxy of a first switch is designated as the active proxy and controls failover in the event a switch fails or otherwise becomes unavailable. A second site proxy of a second switch is designated as the backup proxy and controls failover in the event the first switch fails or otherwise becomes unavailable. In the event a switch fails or otherwise becomes available, the active proxy interacts with the configuration controller and reassigns the extensions associated with the failed switch to a different switch of the plurality of switches. If a configuration controller fails or otherwise becomes unavailable, another configuration controller becomes active and establishes communication with the plurality of switches to maintain the operational status of the IP telephony system.

9 Claims, 9 Drawing Sheets

(56) References Cited

U.S. PATENT DOCUMENTS

| | | |
|---|---|---|
| 2006/0109783 A1 | 5/2006 | Schoeneberger et al. |
| 2006/0233174 A1 | 10/2006 | Rothman et al. |
| 2006/0256767 A1 | 11/2006 | Suzuki et al. |
| 2007/0101379 A1 | 5/2007 | Pereira |
| 2007/0159963 A1 | 7/2007 | Qing et al. |
| 2008/0013447 A1 | 1/2008 | Lauber |
| 2009/0132714 A1 | 5/2009 | Blander |
| 2010/0106842 A1 | 4/2010 | Cosmadopoulos et al. |
| 2012/0008635 A1* | 1/2012 | Kuo ........................ H04L 45/00 370/410 |

* cited by examiner

FAILOVER SYSTEM AND METHOD FOR IP TELEPHONY

CROSS REFERENCE TO RELATED APPLICATIONS

The present application is a Continuation under 35 U.S.C. § 120 of co-pending U.S. patent application Ser. No. 13/418,301 entitled "Failover System And Method For IP Telephony," filed on Mar. 12, 2012, which claims the benefit of priority under 25 U.S.C. § 120 to U.S. patent application Ser. No. 12/395,155 entitled "Failover System And Method For IP Telephony," filed on Feb. 27, 2009 and issued as U.S. Pat. No. 8,159,935 B1 on Apr. 17, 2012, which claims the benefit of priority under 35 U.S.C. § 119(e) of U.S. Provisional Application No. 61/144,020 entitled "Failover System And Method For IP Telephony," filed on Jan. 12, 2009, the entire contents of which are incorporated by reference herein.

BACKGROUND OF THE INVENTION

Field of the Invention

The present invention relates to a system and method for performing failover in an IP telephony system when a component fails or becomes unavailable.

Description of the Related Art

Systems that deliver voice communications over the Internet or other packet-switched networks have become common place and are generally referred to as IP telephony systems or Voice over Internet Protocol (VoIP) systems. Such IP telephony systems are particularly advantageous because they reduce the communication and infrastructure costs by routing calls over existing data networks. However, in comparison to conventional circuit-switched networks in which the telephone companies maintain and power phone lines, IP telephony systems can have less reliability and be subject to network availability.

In existing IP telephony systems, a number of extensions or phones are typically serviced by a IP telephony switch. An IP telephony switch is a general or special purpose computer that processes IP telephony signaling protocols, may control traditional telephony signaling protocols, and may process audio or video media. One of the issues affecting the reliability of the IP telephony system is the reliability of the switch and the network. In the event the switch fails or becomes unavailable due to lack of connection to the network, the extensions or phones associated with that switch are rendered inoperable. When the switch becomes operable or the network is available, a number of serviced requests are issued, for example, one for each extension. However, this often creates a flood of service requests that the configuration controller is not able to handle and delays resetting of the switch and the availability of the extensions or phones associated with the switch.

SUMMARY OF THE INVENTION

The present invention overcomes the deficiencies of the prior art with a failover system and method for IP telephony. In one embodiment, the failover system includes a plurality of configuration controllers and a plurality of switches. The configuration controllers include a telephony management software unit, a failover module and a switch table. The switches include a site proxy, a failover module and a routing table. A first site proxy of a first switch is designated as the active proxy and controls failover in the event any switch fails, loses network connectivity or otherwise becomes unavailable. A second site proxy of a second switch is designated as the backup proxy and controls failover in the event the first switch fails, loses network connectivity or otherwise becomes unavailable. In the event a switch fails or otherwise becomes available, the active proxy interacts with the configuration controller to reassign the extensions associated with the failed switch to a different switch of the plurality of switches. In the event a configuration controller fails or otherwise becomes unavailable, another configuration controller becomes active and establishes communication with the plurality of switches to maintain the operational status of the IP telephony system. The present invention also includes a number of methods such as a method for failover for a switch in an IP telephony system, a method for failover for a configuration controller in an IP telephony system and a method for establishing failover priority among a plurality of switches.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF PREFERRED EMBODIMENTS

Figure 1:
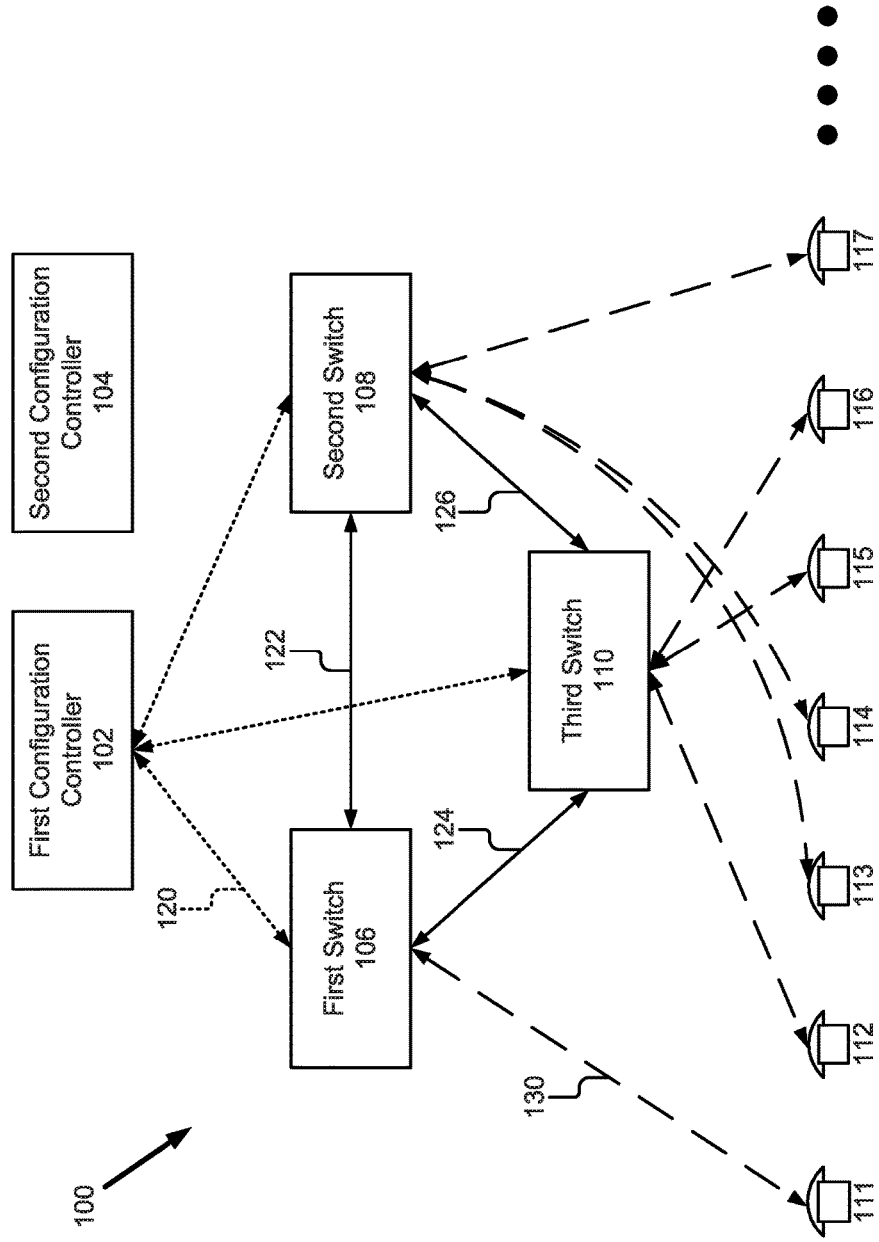
FIG. 1 is a block diagram of a first embodiment of an IP telephony failover system in accordance with the present invention.

A failover system and method for an IP telephony system 100 is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to a particular arrangement of extensions, switches and configuration controllers. However, those skilled in the art will recognize that the present invention applies to any arrangement of extensions, switches and configuration controllers among one or more sites.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In particular the present invention is described below in the context of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present invention is described without reference to any particular programming language. It will be appreciated that a variety of programming languages may be used to implement the teachings of the invention as described herein.

FIG. 1 shows an embodiment of a failover system 100 in accordance with the present invention. The failover system 100 comprises a first configuration controller 102, a second configuration controller 104, a first switch 106, a second switch 108, a third switch 110, and a plurality of phones or extensions 111-117.

It should be understood that the failover system 100 depicted in FIG. 1 is only one example of such a system. While the failover system 100 is shown as including the first configuration controller 102 and the second configuration controller 104, other embodiments of the failover system 100 have any number of configuration controllers greater than one. Similarly, while the failover system 100 is shown as having the first switch 106, the second switch 108 and the third switch 110, other embodiments of the failover system 100 comprise any number of switches greater than one. Finally, while the failover system 100 is shown as having a plurality of phones or extensions 111-117, other embodiments of the failover system 100 may have any number of phones or extensions 111-117.

The first configuration controller 102 and the second configuration controller 104 have the same or similar functionality; therefore the description below of the first configuration controller 102 applies equally for the second configuration control 104 as well. The first configuration controller 102 is coupled by signal lines 120 for communication with and management of the first switch 106, the second switch 108 and the third switch 110. The first configuration controller 102 controls the configuration of the overall system 100 including the assignment of phones 111-117 to switches 106, 108 and 110. The first configuration controller 102 handles a variety of other functions such as addressing, notifications, load balancing, etc. In one embodiment, the first configuration controller 102 is operable on a hardware server (computer) as part of the telephony management software (TMS) unit. In the example configuration depicted in FIG. 1, the first configuration controller 102 is the primary and active configuration controller while the second configuration controller 104 is the backup configuration controller. In other embodiments having more than two configuration controllers, each configuration controller is assigned a priority that is used to determine which configuration controller becomes the active configuration controller in the event of the failure of any number of configuration controllers with higher priority values.

In one embodiment, the first configuration controller 102 and the second configuration controller 104 are operable on separate servers such that if the server upon which the first configuration controller 102 is operating fails, the second configuration controller 104 can take its place and maintain operation of the system 100. Although not shown, the second configuration controller 104 (or its associated server) is coupled to a network that can be used to establish communication with the first switch 106, the second switch 108 and the third switch 110 in the event of failure of the first configuration controller 102. More specifically, the second configuration controller 104 has a coupling to the first switch 106, second switch 108 and third switch 110 similar to that depicted by signal lines 120 but connected to the second configuration controller 104. In other words, the separate server upon which the second configuration controller 104 operates is independently coupled to the first switch 106, the second switch 108 and the third switch 110.

Figure 6:
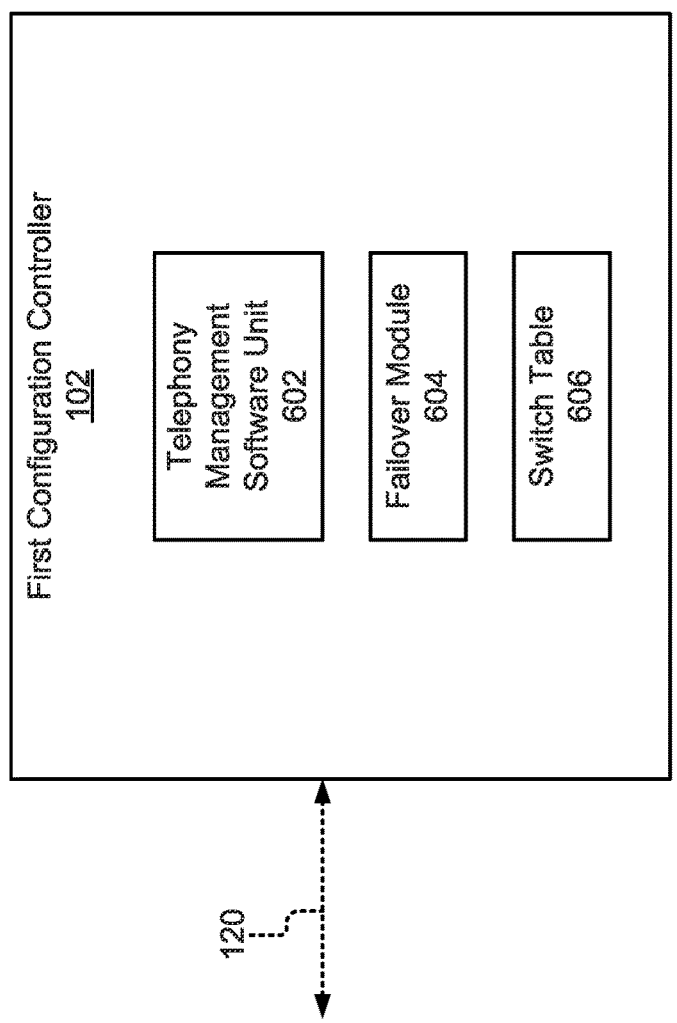
FIG. 6 is a block diagram of an embodiment of a configuration controller in accordance with the present invention.

Referring now also to FIG. 6, a more particular embodiment of the first configuration controller 102 is shown. In addition to the functionality described above, the first configuration controller 102 includes a telephony management software unit 602, a failover module 604 and a switch table 606. Likewise, the second configuration controller 104 also includes a respective telephony management software unit 602, a failover module 604 and a switch table 606.

The telephony management software unit 602 has the functionality described above. The telephony management software unit 602 operates to reassign phones/extensions, if possible, to another switch in the system 100. When the telephony management software unit 602 configures the phone/extension on another switch, a remote procedure call (RPC) protocol relays this information to the active switch, in particular its site proxy 502 (see FIG. 5). However, the telephony management software unit 602 also includes functionality for monitoring the operational status of other configuration controllers. For example, the telephony management software unit 602 of the first configuration controller 102 monitors the operational status of the second configuration controller 104. Similarly, the telephony management software unit 602 of the second configuration controller 104 monitors the operational status of the first configuration controller 102. Those skilled in the art will recognize that each of the telephony management software units 602 could monitor the operational status of any number of other configuration controllers in the system 100 in addition to the first configuration controller 102 and the second configuration controller 104. As noted above, in the example configuration depicted in FIG. 1, the first configuration controller 102 is the primary and active configuration controller while the second configuration controller 104 is the backup configuration controller. Thus, in even a more basic embodiment, the telephony management software unit 602 of the first configuration controller 102 need not monitor the operation of the second configuration controller 104 and only the telephony management software unit 602 of the second configuration controller 104 monitors the operational status of the first configuration controller 102. The telephony management software unit 602 of the active configuration controller, the first configuration controller 102, is also responsible for communicating information about the switches 106, 108 and 110 that it controls and manages. The telephony management software unit 602 collects and sends this information to other configuration controllers, the second configuration controller 102, for storage in their respective switch tables 606.

In the event the active configuration controller, the first configuration controller 102, fails or otherwise becomes unavailable, the telephony management software unit 602 of the backup configuration controller, second configuration controller 104, generates a signal and notifies its failover module 604 of failure. The failover module 604 of the backup configuration controller in turn initializes itself and becomes operational. The failover module 604 then establishes communication with the switches identified in the switch table 606, the first switch 106, the second switch 108 and the third switch 110. The failover module 604 then establishes the second configuration controller 104 as the active configuration controller. The switch table 606 of the backup configuration controller includes a listing of the switches associated with the active configuration controller, their virtual IP addresses and other information needed to communicate with them and establish the backup configuration controller as the primary and active configuration controller.

The first switch 106, the second switch 108 and the third switch 110 have the same or similar functionality, therefore only the first switch 106 will be described here. The first switch 106 represents a Voice over Internet Protocol (VoIP) device that provides a number of extensions for phones 111-117. Although not shown, the first switch 106 is coupled to a network for communication with the second switch 108, the third switch 110, the first controller 102, the second controller 104 and the plurality of phones 111-117. The coupling of the first switch 106 to the phones 111-117 is depicted by dashed line 130. More specifically the first switch 106 is coupled only to phone 111 in FIG. 1. The coupling of the first switch 106 to the first controller 102 is depicted by dashed lines 120. The coupling of the first switch 106 to other switches 108, 110 is depicted by signal lines 122, 124 and 126. The first switch 106, second switch 108, and the third switch 110 may communicate with each other via the signal lines 122, 124 and 126 using a RPC protocol. The first switch 106 may also be coupled to the public switched telephone network (PSTN) via an analog or digital trunk line (e.g., a T1 or E1 interface). The first switch 106 also includes a call manager for controlling the one or more phones with which it is associated. The call manager performs call-related functions such as initiating calls, transferring calls, placing calls on hold, and obtaining caller ID information. In the example configuration depicted in FIG. 1, the first switch 106 acts as a proxy switch while the second switch 108 is the backup switch. The proxy switch is responsible for controlling the failover process.

Figure 5:
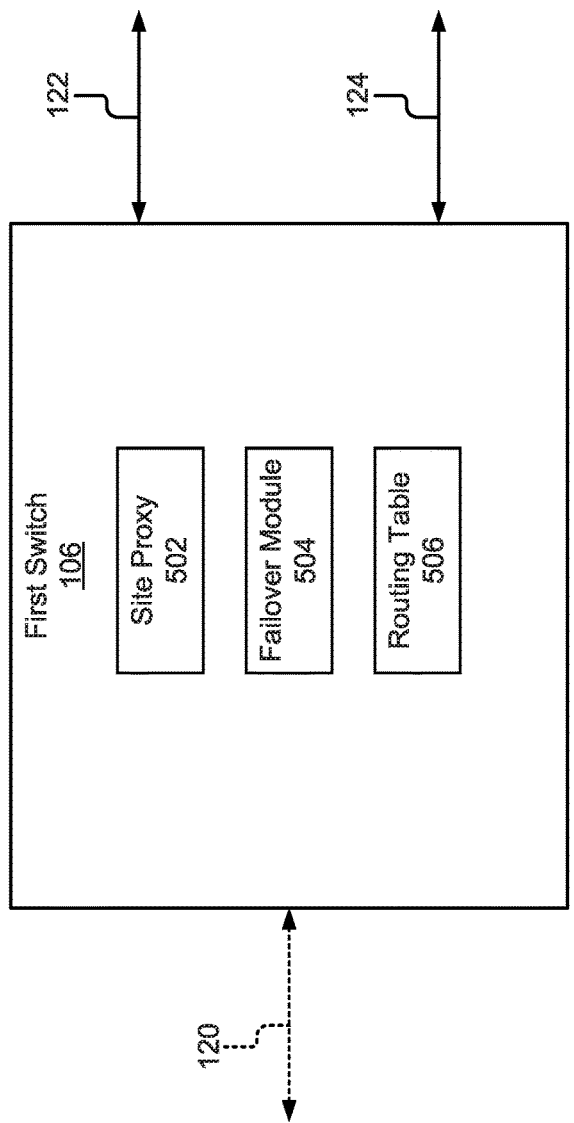
FIG. 5 is a block diagram of an embodiment of a switch in accordance with the present invention.

Referring now also to FIG. 5, one embodiment for the first switch 106 is shown in more detail. In addition to the functionality described above, the first switch 106 includes a site proxy 502, a failover module 504 and a routing table 506 to provide the failover functionality of the present invention. The second switch 108 and the third switch 110, each also have a respective site proxy 502, failover module 504 and a routing table 506.

The site proxy 502 monitors the operational status of the other switches 108, 110 and in the event of switch failure notifies the failover module 504. The site proxy 502 monitors the operational status of the other switches 108, 110 in two ways. First, the site proxy 502 generates an audit or heartbeat signal and repeatedly sends it to the other switches 108, 110, for example, every two minutes. If the other switches 108, 110 do not respond to the heartbeat signal within a predetermined amount of time (e.g., four minutes), the site proxy 502 issues a signal to the failover module 504 specifying the non-responsive switch. Lack of response indicates that the switch has failed, lost network connectivity or is otherwise available. In one embodiment, the site proxy 502 also updates the status of any phones 111-117 in the routing table 506 that are associated with the failed switch and changes the status of those phones in the routing table to unreachable. Second, when the site proxy 502 receives a call request from a phone 111-117 and cannot route that request because the switch is unavailable, the site proxy 502 generates a signal for that specific phone and sends it to the failover module 504. In this way, if the user attempts to make a call, the call may fail but the extension will be restored (reassigned), and a retry of the call attempt will likely succeed. The site proxy 502 is also responsible for maintaining the routing table 506 which includes information about the phones 111-117 and the switch 106, 108, 110 with which they are configured to operate.

The failover module 504 is responsible for communicating with the active configuration controller, the first configuration controller 102, and reassigning the phones associated with a nonoperational switch. The failover module 504 is coupled to the site proxy 502 to receive the failure signal. Upon receiving the failure signal, the failover module 504 issues a service request to the active configuration controller. The failover module 504 receives a reconfiguration response including the extension and the new switch assignment from the active configuration controller and the failover module 504 updates the routing table 506 with the information received from the configuration controller, in particular its telephony management software unit 602.

In another embodiment, when the site proxy 502 detects that a switch at the site is unreachable or has failed and sends the failure signal to the failover module 504, the failover module sets a timer for a predetermined amount of time, for example two minutes, to allow any normal rebooting to occur. When the timer expires, the failover module 504 scans the routing table 506 for any phones/extensions 111-117 that are marked as unreachable. The failover module 504 identifies an unreachable phone/extension 111-117 and it sends a service request message to the first configuration controller 102 with a port ID and switch ID of the extension and marks the entry in the routing table 506 as "reassignment pending" so the failover module 504 does not send multiple requests for the same extension. This feature is particularly advantageous because it prevents the active switch, the first switch 106, from sending a flood of service requests to the first configuration controller 102. In other words, the failover module 504 effectively self throttles service requests that are sent to the first configuration for 102. While this embodiment of the present invention sends identifying information, such as the port ID and the switch ID, to allow the first configuration controller 102 to identify the phone/extension 111-117 that needs to be reassigned, those skilled the art will recognize that other information about the extension may be used in place of the port ID in the switch ID.

In yet another embodiment, the failover module 504 continually reviews the routing table 506 and issues service requests to the first configuration controller 102 in a sequential manner. When the telephony management software unit 602 of the first configuration controller 102 configures or reassigns an extension from a failed switch to another, this information is communicated to the site proxy 502 using the RPC protocol. The site proxy 502 then updates the entry corresponding to the reassigned extension in the routing table 506. Either after updating the entry in the routing table 506 or after the lapse of a predetermined amount of time (e.g., 30 seconds), the failover module 504 scans the routing table 506 for any extension/phone 111-117 marked as unreachable. If an unreachable extension/phone 111-117 is found in the routing table 506, the failover module 504 selects an unreachable extension/phone 111-117 and sends a service request for the selected extension to the first configuration controller 102. Once the failover module 504 has sent requests for all the extensions/phones 111-117 associated with a failed switch, it resets its routing table 506 and starts again. This process continues until all unreachable extension/phone 111-117 are reassigned or the unreachable switch comes back online. Such an approach is particularly advantageous because the rate of reassigning extensions will be throttled to a reasonable rate (and may even be prescribed by setting the above lapse time). Thus there will not be an unmanageable or unserviceable number of extension reassignments.

It should be understood that the above reassignment process implemented by the failover module 504 is constrained by the number of available ports on the reachable switches 106, 108 and 110. The automated process continues until there are no more available ports, until more ports come online, or the unreachable switch comes back online.

The routing table 506 table stores information about the first switch 106, the second switch 108, the third switch 110 and their associated phones/extensions 111-117. The routing table 506 also stores information indicating whether the phones/extensions 111-117 are available, unavailable or have a pending reassignment. The routing table 506 is coupled to and can be updated by either the by the failover module 504 or the site proxy 502. The routing table 506 also stores information about which configuration controller it is associated with and to which it sends service requests.

The plurality of phones or extensions 111-117 are conventional IP phones or soft phones or combinations thereof. The phones 111-117 enables a user to carry on a phone call. The plurality of phones 111-117 are coupled for communication with the first switch 106, the second switch 108 or the third switch 110 as depicted by dashed lines 130. For example, in an initial configuration shown in FIG. 1, phone 111 is coupled to the first switch 106; phones 113, 114 and 117 are coupled to the second switch 108; and phones 112, 115 and 116 are coupled to the third switch 110. More particularly, in FIG. 1, the phones 111-117 are session initiation protocol (SIP) phones. It is one embodiment, when a SIP phone/extension is configured, an extra parameter is included such as the port ID. This will be opaque to the switch, but will be included in the data passed between the switches 106, 108 and 110 in by signal lines 122, 124 and 126 in a RPC protocol along with the switch ID. The site proxy 502 will store this information in its routing table 506. In some embodiments, the phones 111-117 include a user interface to send data to and receive data from a user. For example, the phones 111-117 include a Telephone User Interface (TUI) that sends data through a speaker and receives data through a microphone and a keypad.

Figure 2:
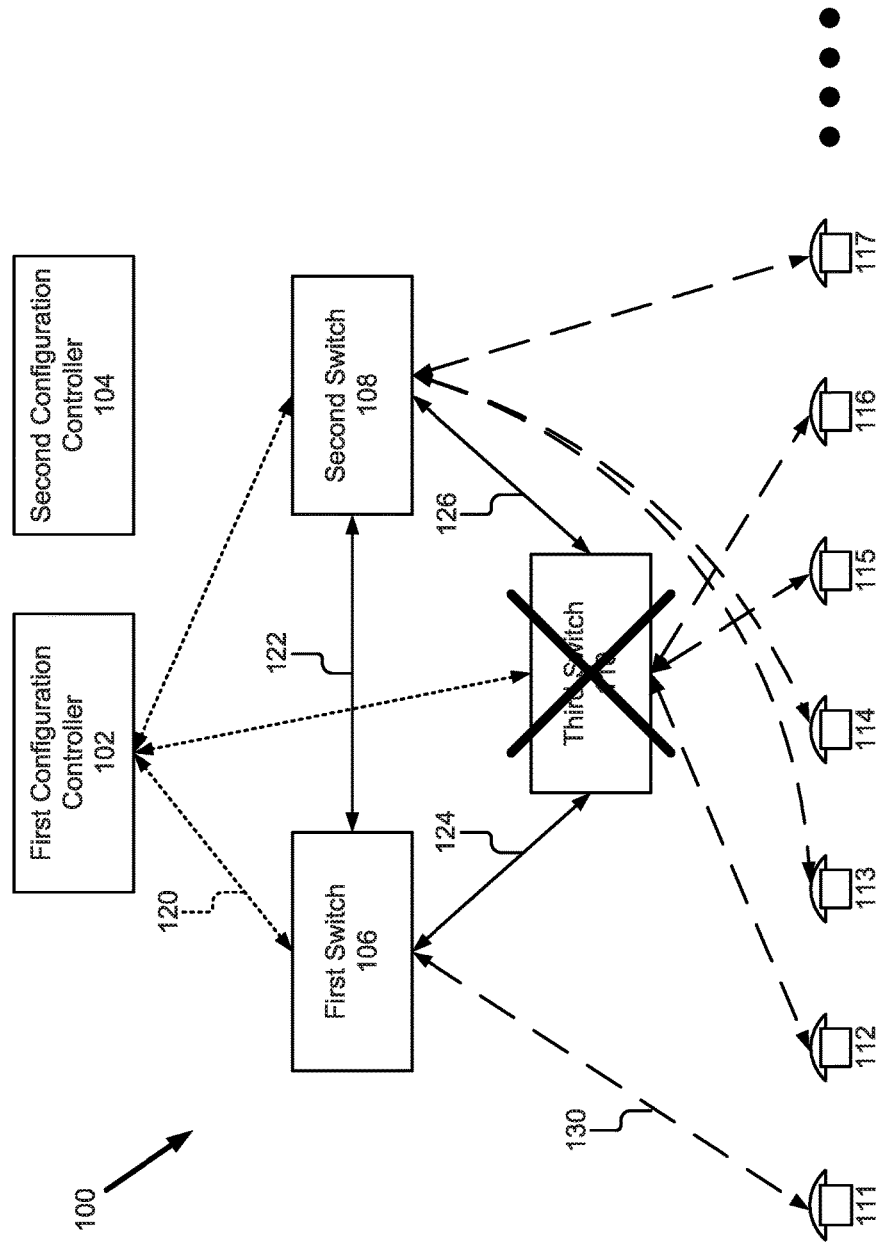
FIG. 2 is a block diagram of the first embodiment of the IP telephony failover system with a switch has failed in accordance with the present invention.

Referring now to FIG. 2, the failover system 100 of FIG. 1 is depicted in which the third switch 110 has failed as indicated by the X. FIG. 2 shows the configuration of the system 100 at the time the third switch 110 fails. As can be seen, the connection of the switches 106, 108, 110 to the phones 111-117 is the same as in FIG. 1. However, because the third switch 110 has failed or is otherwise not available, phones 112, 115 and 116 are also not reachable.

Figure 3:
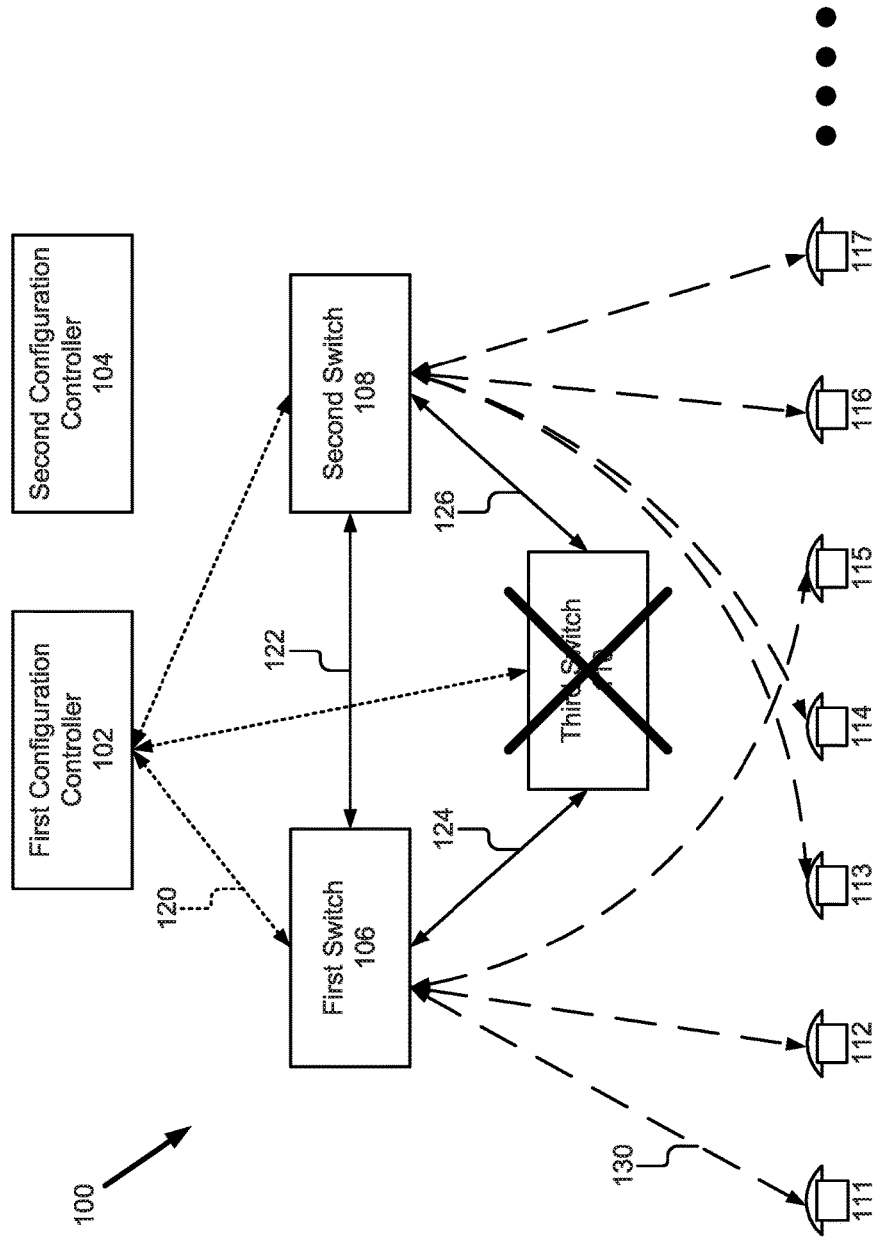
FIG. 3 is a block diagram of the first embodiment of the IP telephony failover system after reassignment of extensions due to switch failure in accordance with the present invention.

Referring now to FIG. 3, the failover system 100 sometime after the third switch 110 has failed and the phones 112, 115 and 116 associated with it have been reassigned to other switches 106 and 108 is shown. Since the first switch 106 is the active switch, upon detecting that the third switch 110 has failed, the first switch 106 initiates reassignment of the phones 112, 115 and 116 to other switches 106 and 108. FIG. 3 shows the end result once the phones 112, 115 and 116 associated with the third switch 110 have been reassigned. More specifically, by comparing FIG. 1 to FIG. 3, it can be seen that phones 112 and 115 have been reassigned to cooperate with the first switch 106; and phone 116 has been reassigned to cooperate with the second switch 108. Thus, after only a small amount of time of unavailability, the phones 112, 115 and 116 are again operational. In the event the third switch 110 becomes operational after failure, the phones 112, 115 and 116 can be assigned back to the third switch 110.

Figure 4:
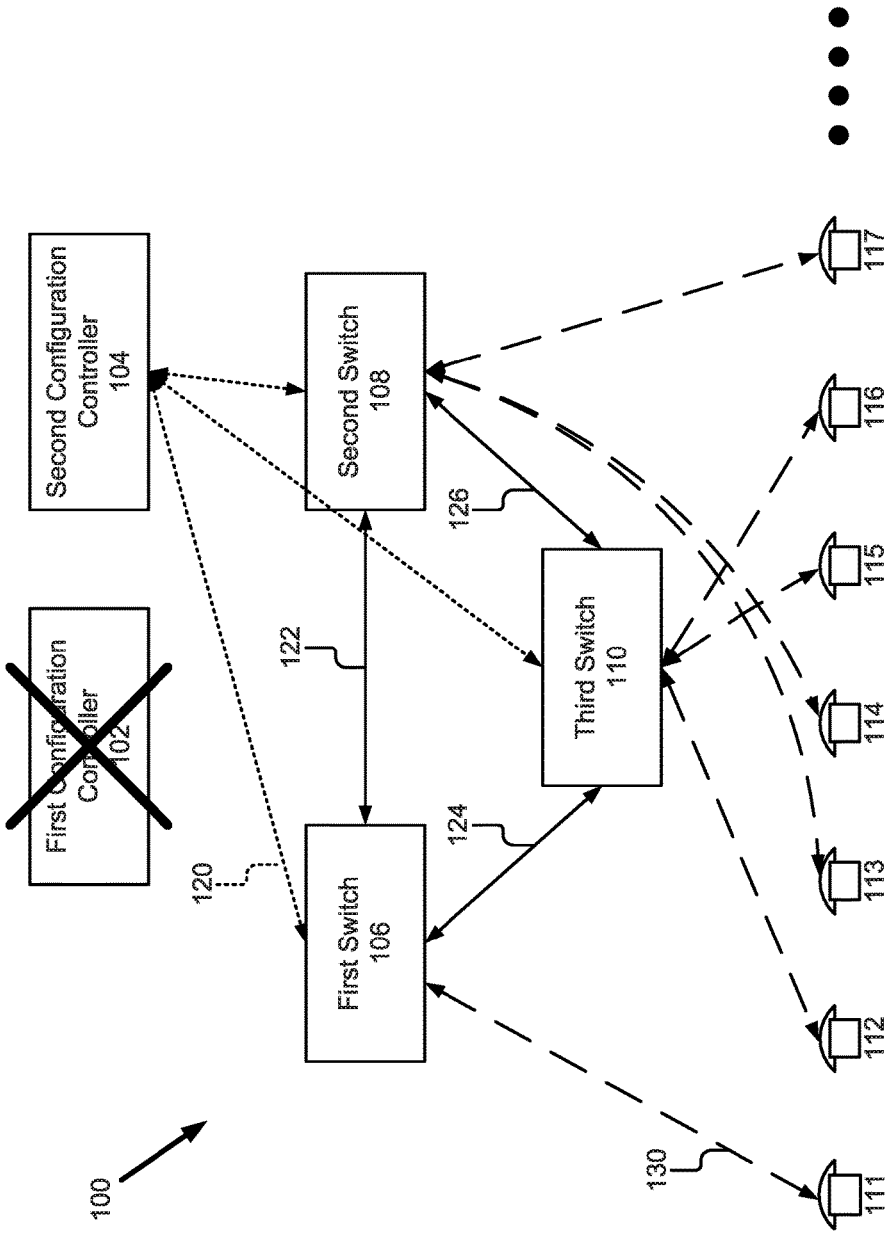
FIG. 4 is a block diagram of the first embodiment of the IP telephony failover system after configuration controller failure in accordance with the present invention.

Referring now to FIG. 4, the failover system 100 sometime after the first configuration controller 102 has failed is shown. As noted above, the first configuration controller 102 is the primary and active configuration controller. Once it fails, the second configuration controller 104 which is the backup configuration controller becomes the active configuration controller. The second configuration controller 104 communicates with the first switch 106, the second switch 108 and the third switch 110 and is established as the primary and active configuration controller. This status is reflected by signal lines 120 in FIG. 4 coupled to for communication with the switches 106, 108 and 110.

Figure 7:
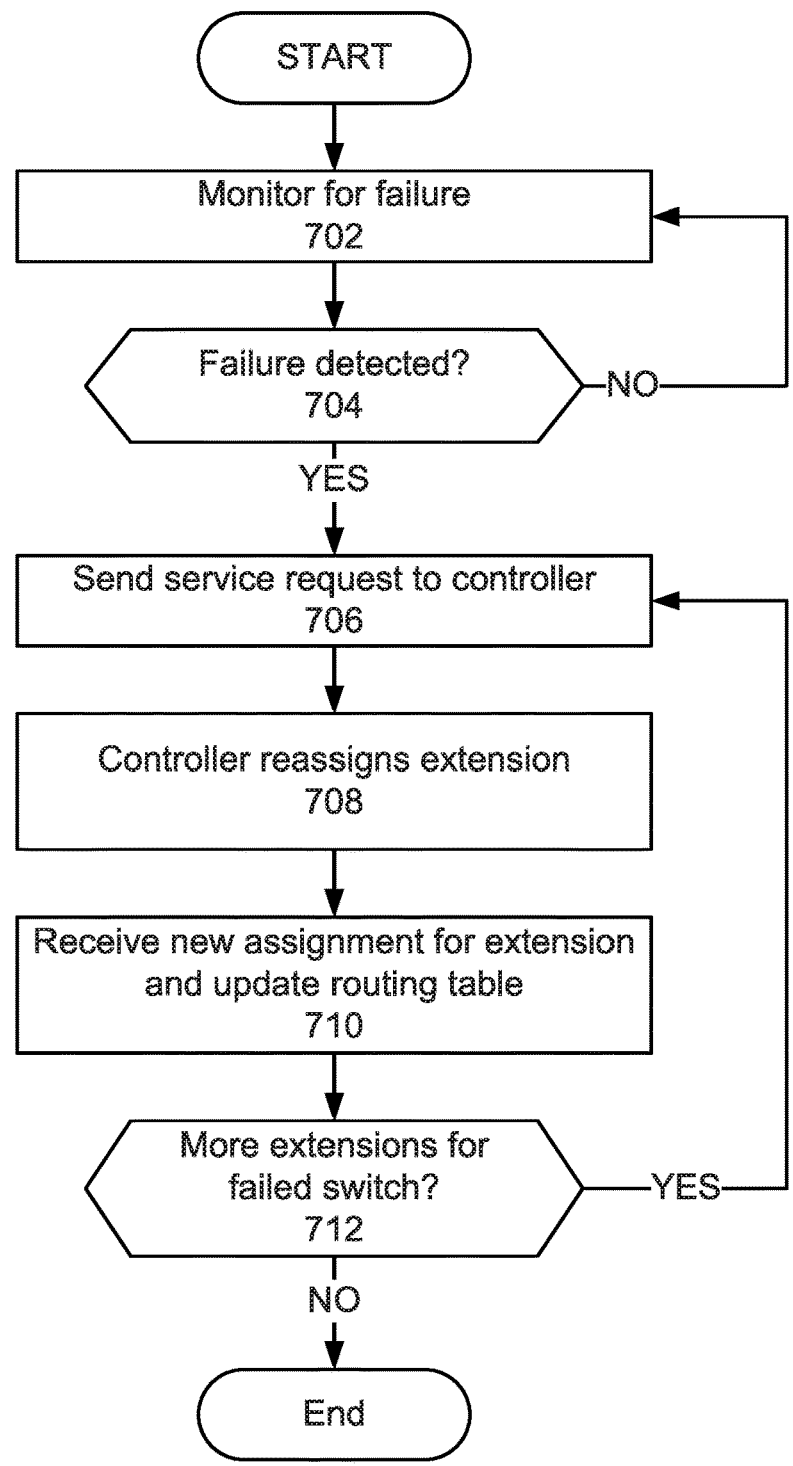
FIG. 7 is a flowchart of a first embodiment of a method for performing failover in an IP telephony system in accordance with the present invention.

Referring now to FIG. 7, one embodiment of a method for providing failover in an IP telephony system 100 will be described. The method begins by monitoring 702 for failure. In particular, the active switch monitors for failure by sending a heartbeat signal to the other switches and monitoring for replies. If a particular switch does not provide a reply that switch is presumed to have failed. Next the method determines 704 whether failure was detected. If not, the method returns to step 702 to monitor for failure. On the other hand, if failure was detected in step 704, the method continues by sending 706 the service request from the active switch, the first switch 106, to the active configuration controller, the first configuration controller 102. The service request includes information identifying the extension requiring reassignment and the failed switch. The first configuration controller 102 receives the service request, determines whether there is another switch with an available port and reassigns 708 the identified extension to the available port. Once the reassignment is completed, the new assignment information for the extension is sent to the active switch. The active switch receives 710 the new assignment information and updates its routing table 506. Finally, the method determines 712 whether there are any additional extensions for the failed switch. This can be determined by scanning the routing table 506 of the active switch for any extensions that have been marked as unreachable. If so, the method identifies and selects another extension and repeats steps 706, 708 and 710 for that extension. On the other hand, if there are no additional extensions for the failed switch, the method is complete and ends.

Figure 8:
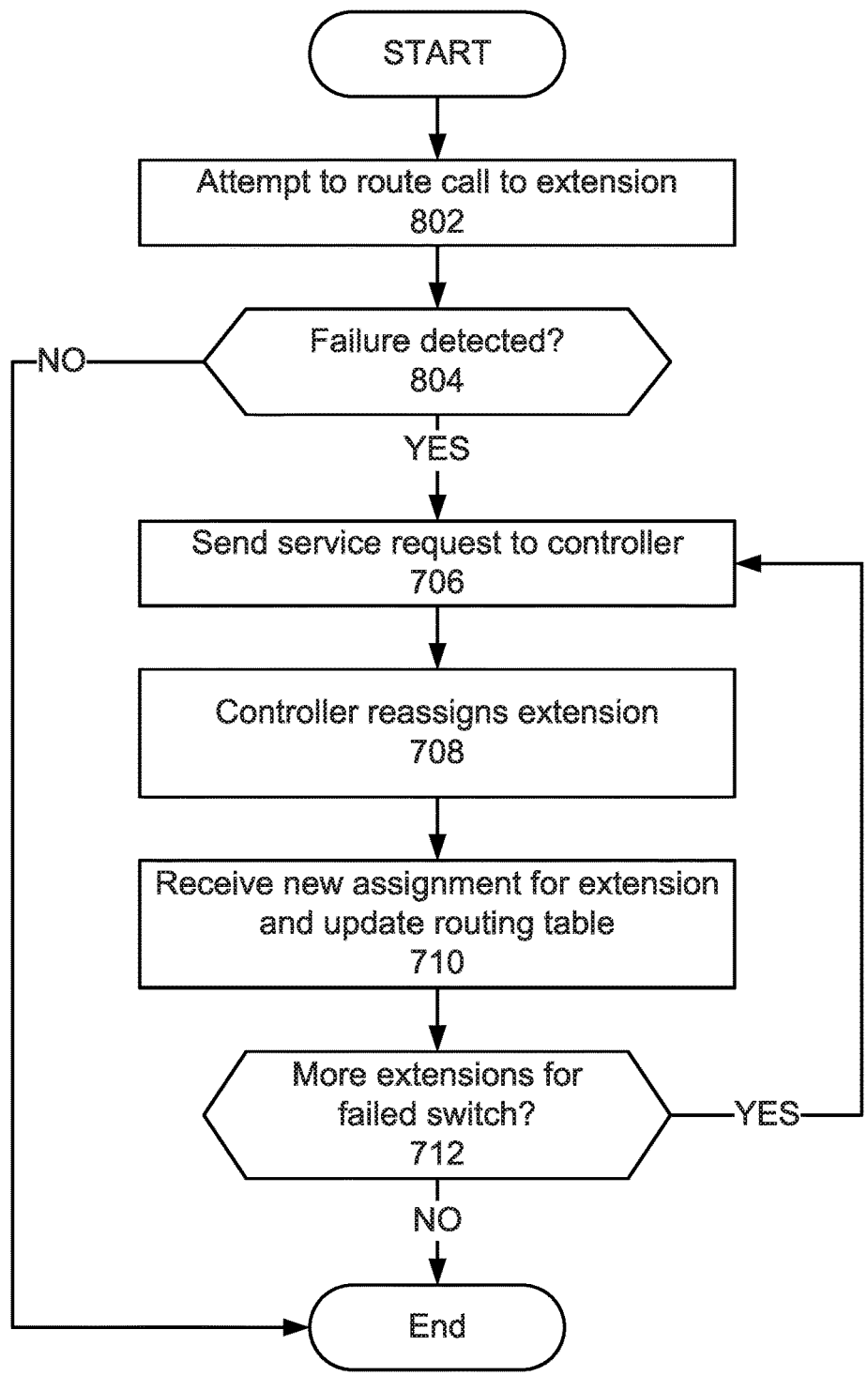
FIG. 8 is a flowchart of a second embodiment of the method for performing failover in the IP telephony system in accordance with the present invention.

FIG. 8 shows a second embodiment of the method for providing failover in the IP telephony system 100 in accordance with the present invention. FIG. 8 shows the method for providing failover "on demand" or in response to an extension being unavailable. The method begins by attempting 802 to route a call to an extension. Next the method determines whether a failure has been detected 804. In this case, a failure is detected if the attempt to initiate a call fails because of switch unavailability. If the call can be placed there is no failure and the method is complete and ends. However if the call cannot be placed then failure was detected, and the method continues to perform step 706 through step 712 as has been described above to reassigned the extension to another switch.

Figure 9:
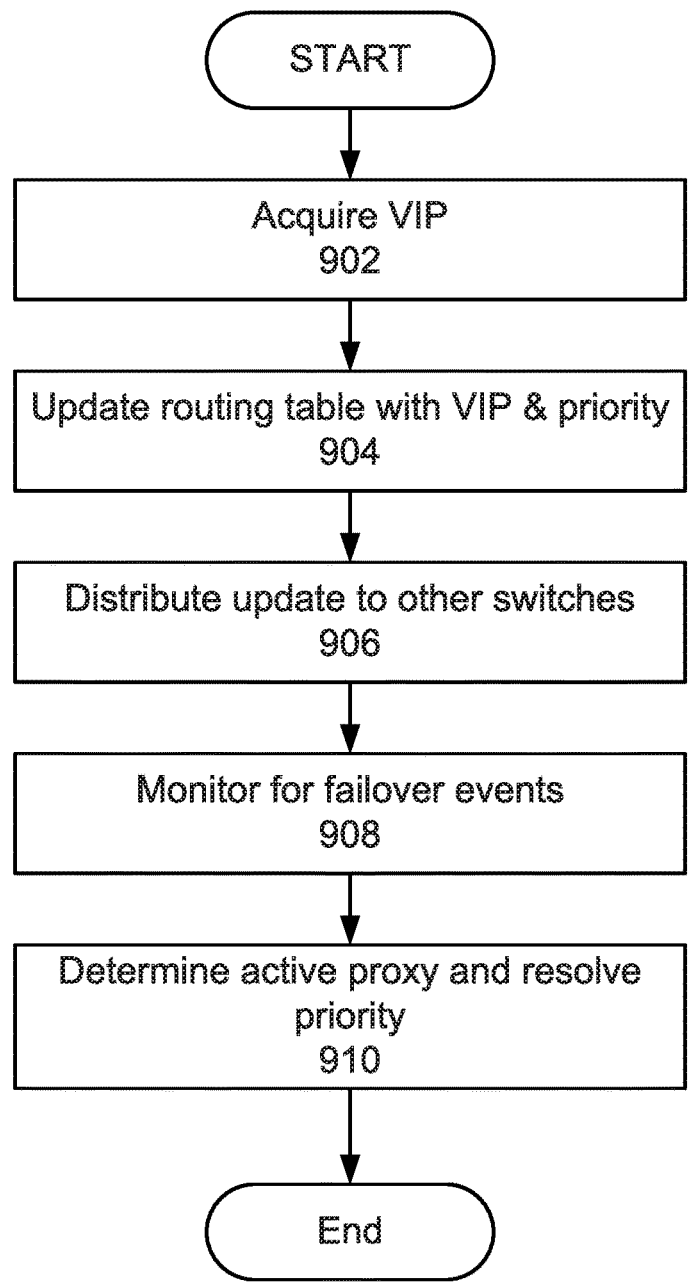
FIG. 9 is a flowchart of an embodiment of a method for establishing failover order in the IP telephony system in accordance with the present invention.

Referring now to FIG. 9, an embodiment of a method for establishing failover order of a plurality of switches 106, 108 and 110 in the IP telephony system 100 in accordance with the present invention is described. As described above, in certain embodiments the system 100 includes one active proxy and one or more other backup proxies. Each of the backup proxies can include a priority value that specifies the order in which the backup proxies become the active proxy in the event the active proxy fails. The active proxy is responsible for monitoring for failure and initiating and controlling the reassignment of connections to switches. In accordance with the present invention, all switches at a site are configured with a virtual IP (VIP) address. In addition, switches that act as an active proxy or backup proxy receive information from the first configuration controller 102 indicating: 1) that they are a proxy and 2) their priority. The process described below is performed by switches as they are added to the system 100. The method of establishing a failover order for the plurality of switches begins with a switch acquiring 902 a virtual IP address. The routing table 506 of the switch is then updated with the acquired address, priority information and an indication as a potential proxy. Similarly, once the switch drops its virtual IP address, the entry is deleted from table 506. Next the method distributes 906 this information to other switches. This information is distributed to the other switches in the same way that other routing data is distributed. The method then monitors 908 for failover events. Example failover events include: a switch becoming reachable, a switch becoming unreachable, an entry in a routing table adding a potential proxy, or an entry in a routing table deleting a potential proxy. If any of the events occur, the method proceeds to step 910 to determine the active proxy and resolve priority. The priority is resolved using the following logic. If the current switch performing this method is the active switch and if another switch is also indicated to be the active switch, then the method determines which switch has higher priority and if current switch has a higher priority, it sends a gratuitous message to the other switch. If the other switch has a higher priority, the current switch changes its status to be a backup switch. If the current switch is not the active switch, it determines whether there is an active switch. If not, the current switch becomes the active switch if a stand-off time has lapsed. In one embodiment, the stand of time is defined as 15 seconds past the time when the first event was received if the switch is the active switch and 30 seconds past the time when the first event was received if the switch is a secondary or backup switch. If there is already an active switch, the no changes to priority are made and the current switch is a secondary proxy. It should also be noted that when a switch acquires a virtual IP address, it sends an event to the first configuration controller 102 so that the status of the switch provide throughout the system 100.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A method for failover in an IP telephony system performed by one or more computing devices, the IP telephony system comprising a plurality of networked switches each assigned to route calls and requests from different extensions, the method comprising:
   acquiring a virtual IP address by a first switch, the first switch including a routing table and a site proxy designated as an active proxy, the active proxy being a component that controls failover in the event one or more other switches of the IP telephony system fails, loses network connectivity or otherwise becomes unavailable;
   updating the routing table of the first switch with the virtual IP address and priority information associated with the first switch;
   distributing information about the virtual IP address and the priority information to one or more other switches of the IP telephony system, the one or more other switches each including a site proxy designated as a backup proxy;
   monitoring, by the first switch, the one or more other switches for a failover event associated with at least one of the one or more other switches;
   in response to detecting a failover event associated with at least one of the one or more other switches, assigning connections of the at least one of the one or more other switches associated with the failover event to the first switch;
   determining a failover event of the active proxy associated with the first switch; and
   responsive to determining the failover event of the active proxy associated with the first switch, assigning a site proxy of at least one of the one or more other switches as the active proxy,
   wherein at least two of the networked switches each actively route calls and requests from different extensions.

2. The method of claim 1, further comprising:
   deleting the virtual IP address information from the routing table in response to the first switch dropping the acquired IP address.

3. The method of claim 1, wherein monitoring for the failover event further comprises identifying as a failed switch a switch that has failed, lost network connectivity or otherwise is unavailable.

4. The method of claim 1, wherein the failover event involves at least one of a switch becoming reachable, a switch becoming unreachable, an entry in a routing table adding a potential proxy, or an entry in a routing table deleting a potential proxy.

5. The method of claim 1, wherein the first switch and the one or more other switches are each configured with a respective virtual IP address.

6. The method of claim 1, further comprising:
   storing, in the routing table, information about each of the one or more other switches and associated extensions, wherein the information stored in the routing table includes priority value and status as available, unavailable or pending reassignment.

7. The method of claim 6, further comprising:
   storing, in the routing table, information about a configuration controller with which the first switch is associated with and to which the first switch sends service requests.

8. The method of claim 1, wherein monitoring for the failover event further comprises:
   attempting to send a call request to an extension; and
   receiving an indication that the call request cannot be made because a switch is unavailable.

9. The method of claim 8, further comprising:
   waiting a predetermined amount of time before generating a failure signal after receiving the indication that the call request cannot be made.

* * * * *